(12) United States Patent
Arima et al.

(10) Patent No.: US 6,983,769 B2
(45) Date of Patent: Jan. 10, 2006

(54) VIBRATION ABSORBING HOSE

(75) Inventors: Tetsuya Arima, Aichi-ken (JP);
Norihiko Furuta, Aichi-ken (JP);
Ayumu Ikemoto, Aichi-ken (JP)

(73) Assignee: Tokai Rubber Industries, Ltd., (JP)

( * ) Notice: Subject to any disclaimer, the term of this patent is extended or adjusted under 35 U.S.C. 154(b) by 8 days.

(21) Appl. No.: 10/873,395

(22) Filed: Jun. 22, 2004

(65) Prior Publication Data
US 2004/0256017 A1     Dec. 23, 2004

(30) Foreign Application Priority Data

| Jun. 23, 2003 | (JP) | ............................. 2003-178064 |
| Jun. 23, 2003 | (JP) | ............................. 2003-178068 |
| Mar. 29, 2004 | (JP) | ............................. 2004-097082 |

(51) Int. Cl.
*F16L 11/04*     (2006.01)

(52) U.S. Cl. ...................... 138/121; 138/126; 138/122; 138/173; 138/124

(58) Field of Classification Search ................ 131/121, 131/122, 173, 123–127
See application file for complete search history.

(56) References Cited

U.S. PATENT DOCUMENTS

| 2,150,471 | A | * | 3/1939 | Van Vulpen ............. 285/222.4 |
| 2,371,991 | A | * | 3/1945 | Harding ...................... 138/121 |
| 3,297,055 | A | * | 1/1967 | Beck ........................... 138/122 |
| 3,420,553 | A | * | 1/1969 | Poxon et al. .................. 285/49 |
| 4,415,389 | A | * | 11/1983 | Medford et al. ............... 156/91 |
| 5,209,267 | A | * | 5/1993 | Morin ......................... 138/109 |
| 5,297,586 | A | * | 3/1994 | McIntosh .................... 138/109 |
| 5,349,988 | A | * | 9/1994 | Walsh et al. ................. 138/109 |
| 5,678,610 | A | * | 10/1997 | Scarazzo et al. ............ 138/109 |
| 5,715,870 | A | * | 2/1998 | Winter et al. ................ 138/121 |
| 6,186,182 | B1 | * | 2/2001 | Yoon .......................... 138/122 |
| 6,220,023 | B1 | * | 4/2001 | Ezzeddini et al. ............ 60/322 |
| 6,240,969 | B1 | * | 6/2001 | Wildermuth ................ 138/122 |
| 6,279,615 | B1 |  | 8/2001 | Iio et al. ...................... 138/137 |

* cited by examiner

*Primary Examiner*—Patrick Brinson
(74) *Attorney, Agent, or Firm*—Andrus, Sceales, Starke & Sawall, LLP

(57) ABSTRACT

A vibration absorbing hose including a corrugated portion has multi-layered construction of tubular inner rubber layer, pressure resistant reinforcement layer formed on an outer side of the inner rubber layer by providing reinforcing yarns. A radial depth B of the pressure resistant reinforcement layer at a position of each of corrugation valleys of the rubber layer has such relationship with respect to a corrugation valley depth A of the rubber layer as $0 < \text{ or } = B < \text{ or } = 0.7 \times A$, and an opening angle $\theta$ of each of the corrugation valleys of the rubber layer satisfies $\theta < \text{ or } = 100°$.

9 Claims, 14 Drawing Sheets

VIBRATION ABSORBING HOSE

BACKGROUND OF THE INVENTION

The present invention relates to a vibration absorbing hose, more specifically to a vibration absorbing hose which is excellent in pressure resistance and gas permeation resistance, and suitable for plumbing in an engine room for a motor vehicle.

In the past, a tubular rubber hose mainly composed of rubber elastic material has been widely used in a variety of plumbing or piping means for industrial and automotive applications. As such rubber hose has excellent vibration absorbing property, it is often arranged in vibration regions for the purpose of restraining vibration transmission.

For example, in case of plumbing hose such as hose for fuel system or refrigerant conveying hose (air conditioner hose) used in an engine room of a motor vehicle, the plumbing hose serves as to absorb engine vibration, compressor vibration of an air conditioner and other various vibration generated during car driving, and to restrain transmission of the vibration from one member to the other member which are joined via the plumbing hose.

Meanwhile, regardless of industrial or automotive applications, hoses for oil system, fuel system, water system and refrigerant system are formed in multi-layered construction including inner rubber layer, outer rubber layer and reinforcement layer interposed between the inner and outer rubber layers, for example, as disclosed in the Patent Document 1 below. The reinforcement layer is typically constructed by arranging or braiding reinforcing yarns.

FIG. 12 shows construction of a refrigerant conveying hose (air conditioner hose) which is disclosed in the Patent Document 1. The refrigerant conveying hose has multi-layered construction. Reference numeral 200 in FIG. 12 indicates tubular inner rubber layer. Resin inner layer 202 is formed or laminated in an inner side of the inner rubber layer 200. And, first reinforcement layer 204 is formed or laminated on an outer side of the inner rubber layer 200, and second reinforcement layer 206 is formed or laminated on an outer side of the first reinforcement layer 204 with intervening intermediate rubber layer 208 between the first and the second reinforcement layers 204, 206. The first reinforcement layer 204 is formed by winding reinforcing yarn or yarns spirally while the second reinforcement layer 206 is formed by winding reinforcing yarn or yarns spirally in the reverse direction to the winding direction of the first reinforcement layer 204. Further, outer rubber layer 210 is formed or laminated on outer side of the second reinforcement layer 206 as outermost layer which serves as cover layer.

In this example, the reinforcement layers 204, 206 are formed by arranging or winding reinforcing yarns spirally. On the other hand, such reinforcement layer is also likewise formed by braiding or braid-weaving reinforcing yarns. FIG. 13 shows an example of a hose having such braided reinforcement layer. Reference numeral 212 in FIG. 13 indicates reinforcement layer which is formed by braiding reinforcing yarns between the inner rubber layer 200 and the outer rubber layer 210. In this example, resin inner layer 202 is also formed in an inner side of the inner rubber layer 200.

As noted from these examples, all of conventional hoses which have been provided including reinforcement layer therein are shaped straight-sided or straight-walled tube having inner and outer side surfaces which are straight in a longitudinal direction. Meanwhile, in case of such straight-sided tubular hose, the hose needs to be designed to have a length according to rigidity of the hose in order to ensure favorable vibration absorbing property.

In particular, compared to low-pressure hoses for fuel system, water system or the like, a longer length is required for high pressure hoses such as those for oil system (for example, power steering system) or refrigerant system (refrigerant conveying system) to ensure sufficient vibration absorbing property and reduce transmission of noise and vibration to vehicle interior, with corresponding increases in rigidity of the hoses. For example, in case of refrigerant conveying hose, typically the hose of 300 mm to 600 mm in length is adapted to secure vibration absorbing property and reduce transmission of noise and vibration, even for plumbing or piping for direct distance of 200 mm.

However, an engine room is crammed with variety of components and parts. And, specifically in these days, due to necessity to ensure a compartment space as large as possible, an engine room has been designed in compact size and space or clearance in the engine room has been more and more narrowed. Therefore, under the circumstances, if a long hose is arranged in the engine room, it bothers an design engineer to design plumbing arrangement to avoid interference with other components or parts and an operator to handle the hose when arranging the hose in the engine room. Further, such plumbing design and handling of the hose according to types of a motor vehicle should be devised. These result in excessive work load in mounting and assembling vehicle parts and components.

In view of foregoing aspects, it is demanded to develop a rubber hose (rubber-elastic-material hose) of which properties such as vibration absorbing property are improved. One of the means to design the hose in short length without loosing favorable vibration absorbing property is to form the hose with corrugations. Actually, the following Patent Document 2 discloses a fuel hose (a hose for fuel system) of motor vehicle which is provided with corrugations.

FIG. 14 is a view to explain the fuel hose disclosed in the Patent Document 2. In FIG. 14, reference numeral 214 indicates tubular rubber layer, and reference numeral 216 indicates resin inner layer which is formed in the inner surface of the rubber layer 214. As shown in FIG. 14, the fuel hose is provided with corrugated portion 218. Therefore, in this fuel hose, it is possible to effectively absorb generated vibration thanks to flexibility of the corrugated portion 218 in spite of short length of the fuel hose.

Meanwhile, just by providing the hose with corrugated portion 218 as shown in FIG. 14, flexibility can be obtained, but sufficient pressure resistance cannot be ensured. That is, the hose of the disclosure is called a filler hose, and is adapted to a fuel filler opening. Therefore, pressure resistance is not specifically required for the hose of the disclosure. The construction of the hose shown in FIG. 14, wherein bursting pressure is under 1 MPa, may be adapted to a low-pressure hose such as filler hose, but may not be adapted without modification to a hose for which high-pressure resistance is required.

One of means to provide a hose including such corrugated portion or corrugations with pressure resistance may be to form on the hose a reinforcement layer which has a considerable reinforcing effect. The reinforcement layer should not diminish flexibility which the corrugations inherently have, and should be easily and favorably formed on an outer surface side of the rubber layer.

Further, in case that a vibration absorbing hose is applied as air conditioner hose for conveying refrigerant or the like, for example, in an engine room of a motor vehicle, the hose is required to have gas permeation resistance, namely, impermeability to gas from the inside to the outside of the hose, and impermeability to water from the outside to the inside thereof as well as pressure resistance and vibration absorbing property. In such a case, the hose should be provided with gas permeation resistance, in addition to pressure resistance and vibration absorbing property. However, in the hose having a corrugated portion, a surface area is increased in the corrugated portion. So, it is disadvantageous to gas permeation resistance, and countermeasures are required accordingly.

| Patent Document 1 | JP, A, 7-68659 |
| Patent Document 2 | U.S. Pat. No. 6,279,615 |

Under the circumstances described above, it is an object of the present invention to provide a novel vibration absorbing hose which has excellent pressure resistance and gas permeation resistance, and does not loose sufficient vibration absorbing property if formed short in length.

SUMMARY OF THE INVENTION

According to the present invention, there is provided a vibration absorbing hose comprising tubular rubber layer (rubber-elastic material layer) having corrugations (for example, a corrugated portion), and pressure resistant reinforcement layer laminated on an outer surface side of the rubber layer. The pressure resistant reinforcement layer may be constructed so as to have corrugated shape, for example, according to the corrugations of the rubber layer, for example, with the same pitch as in the corrugations of the rubber layer. The pressure resistant reinforcement layer is formed, for example, including reinforcing yarn or yarns provided, for example, interlaced, woven, wound or spiraled on an outer surface side of the rubber layer, for example, generally or roughly along the corrugations of the rubber layer. Here, for example, the pressure resistant reinforcement layer is gradually laminated on the surface side of the rubber layer with providing the reinforcing yarn or yarns. May be applied such pressure resistant reinforcement layer as including reinforcing yarn or yarns knitted, for example, according to the corrugations or wound spirally, for example, according to the corrugations to form layer of shape, for example, according to the corrugations. However, it is preferred to employ the pressure resistant reinforcement layer including the reinforcing yarns braided to form layer of shape, for example, according to the corrugations. In other words, may be applied the means to form the pressure resistant reinforcement layer by braiding the reinforcing yarns. Further, it is effective to laminate a covering layer on an outer surface side of the pressure resistant reinforcement layer. Here, the covering layer may preferably be formed from a rubber-made layer or an outer rubber-made layer (rubber-elastic-material-made layer or outer rubber-elastic-material-made layer).

According to the present invention, the corrugations ensure favorable flexibility of the vibration absorbing hose. So, even if the hose is formed short in length, favorable vibration absorbing property is achieved. That is, the present invention allows required hose length relatively short or short while ensuring favorable vibration absorbing property to the hose. This makes it possible to solve outstanding problems associated with plumbing hose specifically arranged in an engine room of a motor vehicle for which pressure resistance is required, such as plumbing design or handling of the hose during mounting work. Further, by making a required hose length short, there may be obtained another benefit of high degree of design freedom.

In the present invention, the pressure resistant reinforcement layer, for example, formed by providing, for example, interlacing, weaving, winding, spiraling or braiding reinforcing yarn or yarns may provide the vibration absorbing hose with favorable pressure resistance. The present invention may ensure both excellent vibration absorbing property and pressure resistance to the hose.

Furthermore, in case that the pressure resistant reinforcement layer is formed by providing the reinforcing yarn or yarns, for example, on or along the corrugations of the rubber layer, the pressure resistant reinforcement layer may be formed seamless and continuous in both circumferential and longitudinal directions, different from the pressure resistant reinforcement layer formed by winding the reinforcing fabric around the rubber layer. Therefore, the pressure resistant reinforcement layer may enhance pressure resistance of the hose effectively. And, there is no problem that the pressure resistant reinforcement layer considerably disturbs flexibility originated from the corrugations. Further, in one of aspects of the present invention, the pressure resistant reinforcement layer may be easily constructed in production of a vibration absorbing hose, and consequently production cost of the hose may be lowered.

It is desired to provide, for example, braid the reinforcing yarn or yarns at a providing angle (an angle at which the reinforcing yarn or yarns are provided, for example, with respect to the longitudinal direction), for example, a braiding angle, generally equal in portions at corrugation hill position and at corrugation valley position or between the portions at corrugation hill position and at corrugation valley position, for example, during braiding by controlling pulling speed of the reinforcing yarns at braiding machine. If a providing angle, for example, a braiding angle is larger than a neutral angle (54.44°), the vibration absorbing hose tends to be elongated in a longitudinal direction of the hose when internal pressure is exerted thereto. On the contrary, if the providing angle, for example, the braiding angle is smaller than the neutral angle, the vibration absorbing hose tends to expand in a radial direction. That is, the vibration absorbing hose behaves according to the providing angle, for example, the braiding angle when internal pressure is exerted thereto. So, unless the providing angle, for example, the braiding angle is equal in the portions at corrugation hill position and at valley position, or between portions at the corrugation hill position and at corrugation valley position, as the vibration absorbing hose behaves differently in corrugation hills and valleys during subject to the operation, it is afraid that pressure resistance is decreased.

The pressure resistant reinforcement layer formed by winding the reinforcing yarns spirally may be constructed from first reinforcing layer formed by winding reinforcing yarn or yarns in one direction and second reinforcing layer formed by winding reinforcing yarn or yarns in the reverse direction to the winding direction of the first reinforcing layer. The pressure resistant reinforcement layer may be formed by knitting the reinforcing yarn or yarns in either circumferential or longitudinal direction, or by knitting so that knitted loops continue in either longitudinal or circumferential direction. The pressure resistant reinforcement layer knitted in either direction is excellent in stretchability, and therefore has a feature of not decreasing flexibility of the vibration absorbing hose having corrugations.

The corrugations (corrugated portion) may be formed in spirally corrugated pattern where corrugation hills and valleys respectively are continuous in a longitudinal direction of the vibration absorbing hose, and also in annularly corrugated pattern where longitudinally adjacent corrugation hills and longitudinally adjacent corrugation valleys are discontinuous and independent each other.

Further, according to the present invention, in the pressure resistant reinforcement layer formed by providing the reinforcing yarn or yarns, a radial depth, providing depth or wave depth B of the pressure resistant reinforcement layer at a position of each of the corrugation valleys of the rubber layer has such relationship with respect to a corrugation valley depth A or depth A of each of the corrugation valleys of the rubber layer as $0<$ or $=B<$ or $=0.7 \times A$, while an opening angle $\theta$ of each of the corrugation valleys satisfies a condition of $\theta<$ or $=100°$. That is to say, in the vibration absorbing hose of the present invention, the radial depth B of the pressure resistant reinforcement layer at a position of each of the corrugation valleys of the corrugated portion is defined shallower than the corrugation valley depth A of the rubber layer to define a predetermined radial gap between the pressure resistant reinforcement layer and the corrugation valleys of the rubber layer (at production of the vibration absorbing hose).

In the vibration absorbing hose according to the present invention, the rubber layer is deformable so that opposite sides of the portion of each of the corrugation valleys, namely the corrugation valley and halfway portions from the corrugation valley toward hill of the rubber layer come into direct and close contact each other without intervening the pressure resistant reinforcement layer therebetween under act of pressure fluid flowing inside the rubber layer. The portions of each of the corrugation valleys of the rubber layer define a gap or radial gap between the portion of the corrugation valley and the pressure resistant reinforcement layer. As a result, an apparent permeating area for permeating gas from the inside to the outside of the hose, namely substantial permeating area is decreased. Therefore, gas permeation amount may be decreased, and thereby gas permeation resistance of the hose is effectively enhanced.

According to the present invention, the radial depth or wave depth B of the pressure resistant reinforcement layer at a position of each of the corrugation valleys of corrugations of the rubber layer is required to have such relationship with respect to a corrugation valley depth A of the corrugations of the rubber layer as $B<$ or $=0.7 \times A$. If B is over $0.7 \times A$, the corrugation valley and the halfway portions from corrugation valley to hill of the rubber layer are not deformed favorably so as to come into direct and close contact each other under act of the internal pressure, and reduction of gas permeation amount may not be sufficiently achieved.

And, similarly, if an opening angle $\theta$ of each of the corrugation valleys of the rubber layer is greater than $100°$, the corrugation valley and the halfway portions continued therefrom are not deformed sufficiently so as to come into direct and close contact each other under act of the internal pressure, and reduction of gas permeation amount may not be sufficiently achieved either. So, in the present invention, the radial depth B should be equal to or less than $0.7 \times A$, and the opening angle $\theta$ should be equal to or less than $100°$. The radial depth B may be equal to or greater than 0. If the radial depth B is equal to 0, the pressure resistant reinforcement layer is formed, for example, in straight-walled cylindrical shape or non-corrugated shape.

In the present invention, the rubber layer may have a wall thicker in corrugation hills than in corrugation valleys. This construction may restrain gas permeation in the corrugation hills as well as the corrugation valleys, and effectively enhance gas permeation resistance entirely in the vibration absorbing hose.

The vibration absorbing hose may further comprise a resin membrane which is laminated in an inner surface of the rubber layer, or on an outer surface of the rubber layer and in an inner side of the pressure resistant reinforcement layer. As in this construction, gas barrier performance is improved by the resin membrane, gas permeation resistance of the vibration absorbing hose may be enhanced, for example, remarkably. The resin membrane may be formed by electrostatic coating or spraying.

In the present invention, preferably, the resin membrane may be formed from polyamide resin or polyamide type resin, or fluoro-resin or fluoro-type resin.

The resin membrane may be formed in such manner that negatively or positively charged resin powder is sprayed to the rubber layer which acts as counter electrode, the resin powder is attached to the inner or outer surface of the rubber layer by electrostatic attraction, and then the attached resin powder is melted by heating and cooled.

However, there are some other means than electrostatic coating to laminate the resin membrane in or on the rubber layer. The resin membrane may be formed in the inner surface or on the outer surface of the rubber layer by injection molding. Or the resin membrane may be formed in such manner that parison is formed by extruding a molten resin with an extruder and the parison is attached and laminated in the inner surface or on the outer surface of the rubber layer by blow molding.

A wall thickness or thickness of the resin membrane is preferably maximum 0.3 mm or 300 $\mu$m. The reason is that as the wall thickness is larger, the vibration absorbing hose becomes entirely hard or stiff, and vibration absorbing property is deteriorated. However, in injection molding, it is difficult to form the resin membrane with thickness 0.3 mm or 300 $\mu$m or less. In blow molding, it is difficult to form the resin membrane with uniform thickness. By employing electrostatic coating, it is possible to form the resin membrane easily with thin and uniform wall thickness.

However, in the present invention, more preferably the resin membrane has a thickness of 50 $\mu$m to 250 $\mu$m. If the resin membrane has a thickness smaller than 50 $\mu$m, sufficient gas permeation resistance cannot be obtained. On the contrary, if the resin membrane has a thickness larger than 250 $\mu$m, gas permeation resistance is favorable, but vibration absorbing property of the hose is deteriorate as the resin membrane becomes hard or stiff according to circumstances.

Here, in order to form the resin membrane favorably by electrostatic coating, the rubber layer is formed preferably to have a volume resistivity value or a volume resistivity of maximum $1 \times 10^6 \Omega$-cm, or of $1 \times 10^6 \Omega$.cm or less. The volume resistivity value in the rubber layer may be controlled by adjusting blending quantity of carbon black therein. The rubber layer where the volume resistivity value is adjusted to maximum $1 \times 10^6 \Omega$-cm in this manner may result in favorable electrostatic coating of resin powder, restraint of defects such as uneven wall thickness or pinholes, and therefore favorable gas permeation resistance.

According to the present invention, provided is a vibration absorbing hose having sufficient flexibility, and bursting pressure of minimum 1 MPa. The vibration absorbing hose of the present invention is specifically suitable for application of plumbing in an engine room of a motor vehicle with construction which is suitable for plumbing hose to be arranged in an engine room of a motor vehicle.

BRIEF DESCRIPTION OF THE DRAWINGS

FIG. 9 (b) is an explanatory view of formation method of the resin membrane in the another vibration absorbing hose, showing that resin powder is sprayed.

FIG. 9 (c) is an explanatory view of formation method of the resin membrane in the another vibration absorbing hose, showing that the resin membrane is laminated.

Figure 1:
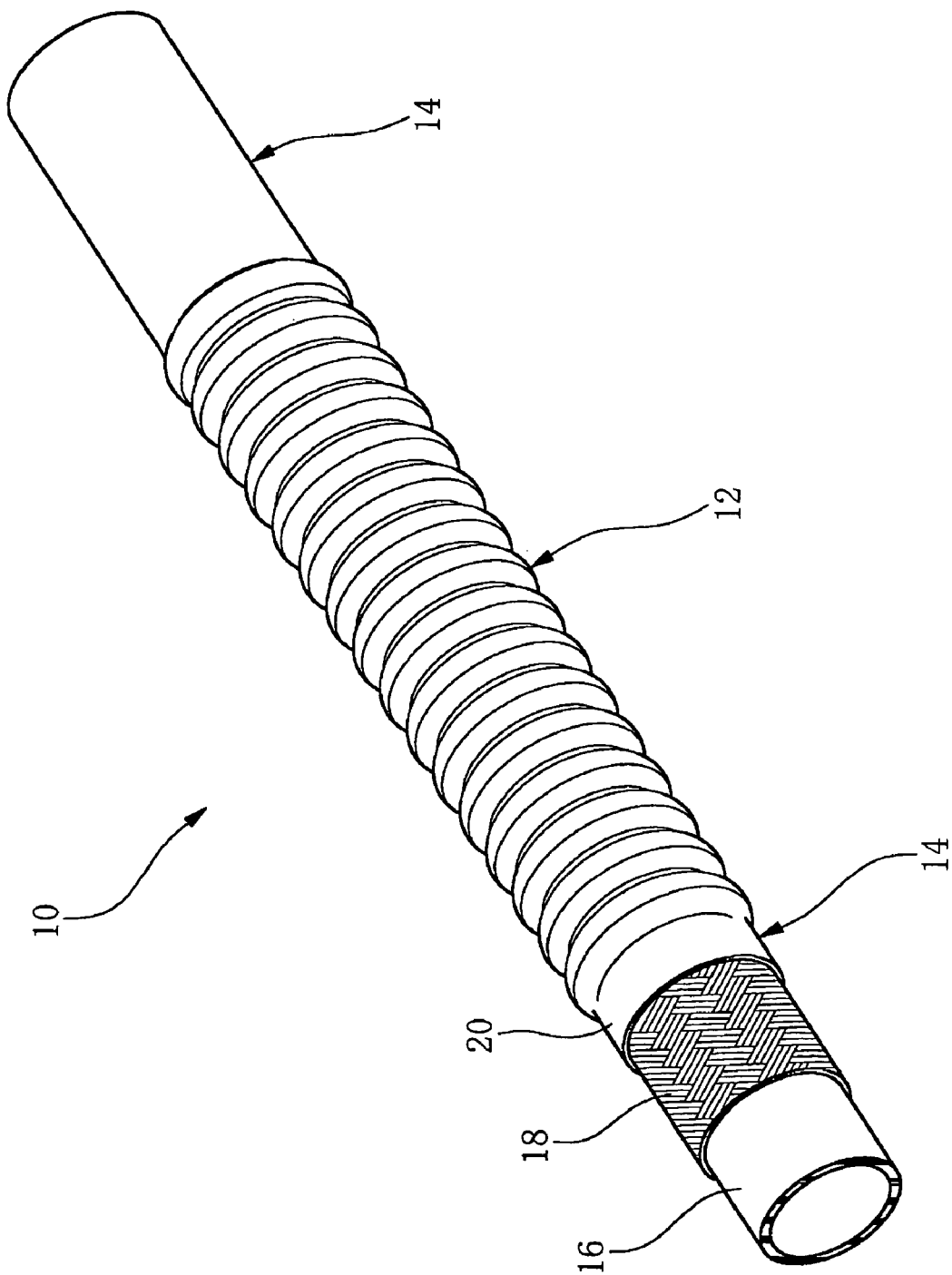
FIG. 1 is a partly cutaway perspective view of a vibration absorbing hose according to the present invention.

Now, the preferred embodiments of the present invention will be described in detail with reference to the drawings.

DETAILED DESCRIPTIONS OF PREFERRED EMBODIMENTS

A vibration absorbing hose 10 (hereinafter simply referred to as a hose 10) according to the present invention shown in FIGS. 1 and 2, which is applied, for example, as refrigerant conveying hose (air conditioning hose), is provided with pressure resistance and gas permeation resistance. The hose 10 has a corrugated portion 12 extending relatively long or for substantially entire part of the hose 10, and end portions 14, 14 of straight-sided tubular shape or straight cylindrical shape. The hose 10 has multi-layered construction, tubular inner rubber layer (inner rubber-elastic-material layer) 16 (rubber layer), pressure resistant reinforcement layer 18 which circumscribes an outer side of the inner rubber layer 16, and outer rubber layer (outer rubber-elastic-material layer) 20 as outermost cover layer.

In the hose 10, the pressure resistant reinforcement layer 18 is formed or constructed by braiding reinforcing yarns or filament member 19 (refer to FIG. 4) over and along, generally along or roughly along an outer surface or an outer surface side of the tubular inner rubber layer 16, more specifically along straight cylindrical shape of the both end portions 14, 14 and along, generally along or roughly along corrugations therebetween, in other words, according to the corrugations therebetween. Therefore, the pressure resistant reinforcement layer 18 is formed in straight cylindrical shape at both end portions 14, 14 and in shape according to the corrugations of the inner rubber layer 16 or in corrugated shape, for example, in shape having corrugation hills and valleys (but in somewhat different shape from the corrugations of the inner rubber layer 16) in the corrugated portion 12 between the both end portions 14, 14. The pressure resistant reinforcement layer 18 is laminated on an outer side of the inner rubber layer 16 in contact or close contact relation with the corrugations of the inner rubber layer 16 at corrugation hill portions or a side of the corrugation hills or only at corrugation hill portions or a side of the corrugation hills. Namely, corrugation hills 18b of the pressure resistant reinforcement layer 18 and the corrugation hills 16b of the inner rubber layer 16 are in contact relation each other. Here, the pressure resistant reinforcement layer 18 has a corrugated portion or waved portion with the same corrugation pitch as the corrugated portion of the inner rubber layer 16.

The inner rubber layer 16 in the hose 10 may be formed from isobutylene-isoprene rubber (IIR), halogenated IIR (chloro-IIR (Cl-IIR or CIIR), bromo-IIR (Br-IIR or BIIR)), acrylonitrile-butadiene-rubber (NBR), chloroprene rubber (CR), ethylene-propylene-diene-rubber (EPDM), ethylene-propylene copolymer (EPM), fluoro rubber (FKM), epichlorohydrin rubber or ethylene oxide copolymer (ECO), silicon rubber, urethane rubber, acrylic rubber or the like. These materials are applied in single or blended form for the inner rubber layer 16.

For the reinforcing yarns or filament member 19 forming the pressure resistant reinforcement layer 18, polyethylene terephthalate (PET), polyethylene naphthalate (PEN), aramid, polyamide or nylon (PA), vynilon, rayon, metal wire or the like may be adapted.

The outer rubber layer 20 may be formed also from every kind of rubber materials cited above as material for the inner rubber layer 16. In addition, heat-shrink tube and thermoplastic elastomer (TPE) tube are also applicable for the outer rubber layer 20. As for material of such heat-shrink tube and TPE tube, acryl type, styrene type, olefin type, diolefin type, polyvinyl chloride type, urethane type, ester type, amide type, fluorine type or the like may be applied. According to this embodiment, the hose 10 is designed to have an inner diameter of approximately 5 mm to 50 mm, preferably 5 to 25 mm.

The inner rubber layer 16 is formed, for example, from material suitably selected according to a fluid flowing inside thereof. However, in case that the hose 10 is applied for hydrofluorocarbon (HFC) type refrigerant conveying hose, specifically IIR or halogenated IIR in single or blended form may be preferably used. It is also effective to apply IIR or halogenated IIR in single or blended form to the outer rubber layer 20.

Figure 2:
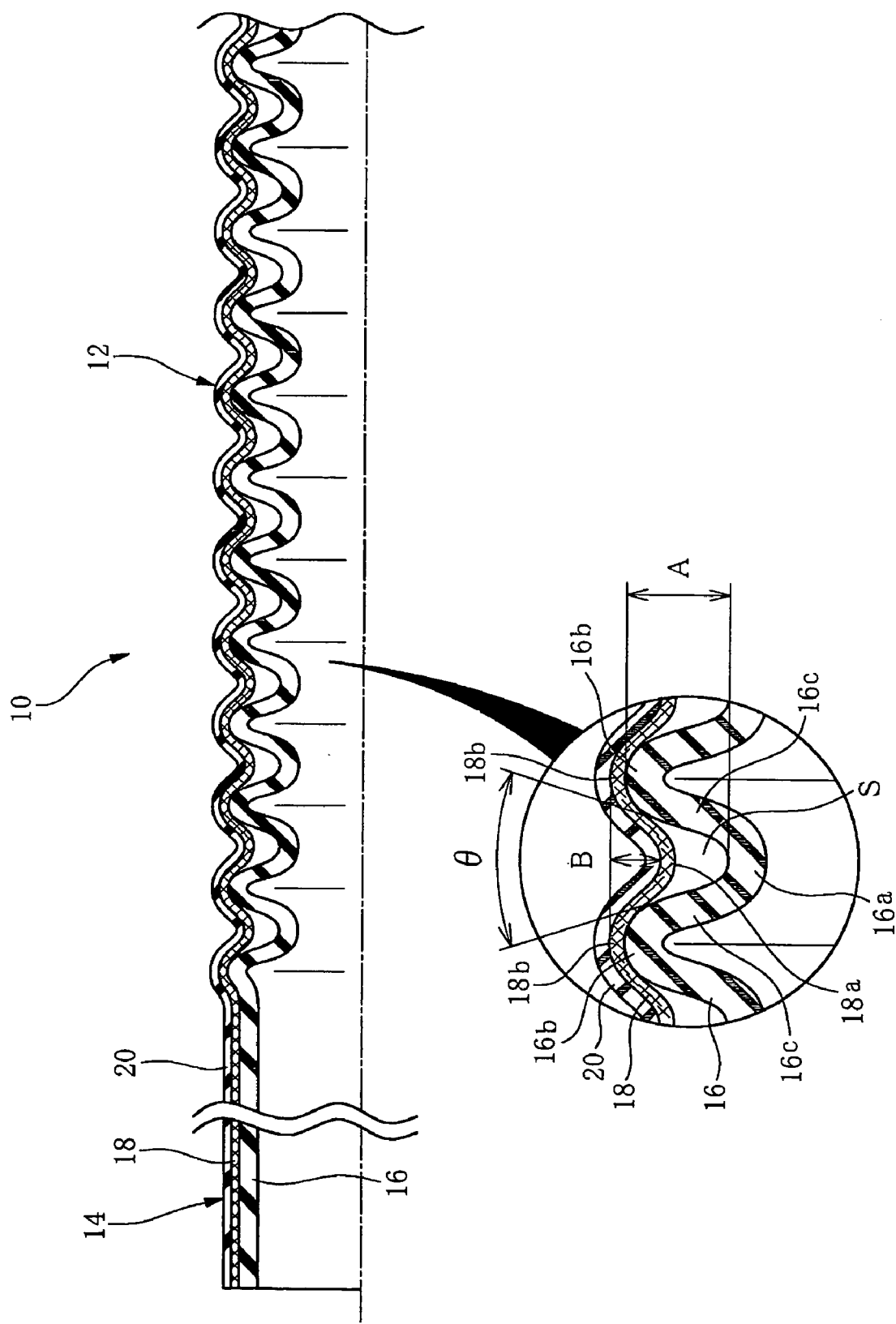
FIG. 2 is a sectional view of the vibration absorbing hose, taken along a longitudinal direction thereof.

In the hose 10, according to the present invention, as shown in an enlarged fragmentary view of FIG. 2, the pressure resistant reinforcement layer 18 includes a portion 18a, for example, of a small diameter which is located at a position of each corrugation valley of the inner rubber layer 16. A radial depth or wave depth B of the portion 18a is designed to have such relationship with respect to a depth, radial depth or corrugation valley depth A of each corrugation valley 16a of the inner rubber layer 16 as 0< or =B< or =0.7×A. And a gap S is defined between the portion or corrugation valley 18a of the pressure resistant reinforcement layer 18 and the corrugation valley 16a and halfway portions 16c from the corrugation valley 16a toward a corrugation hill or peak 16b of the inner rubber layer 16 (at production of the hose 10). And, an opening angle θ of each of the corrugation valleys 16a of the rubber layer 16 is designed as θ< or =100°, preferably θ< or =75°.

The hose 10 as shown in FIGS. 1 and 2 may be manufactured, for example, in the following manner. First, the inner rubber layer 16 including corrugated portion is formed by injection molding, blow molding or the like.

Figure 3:
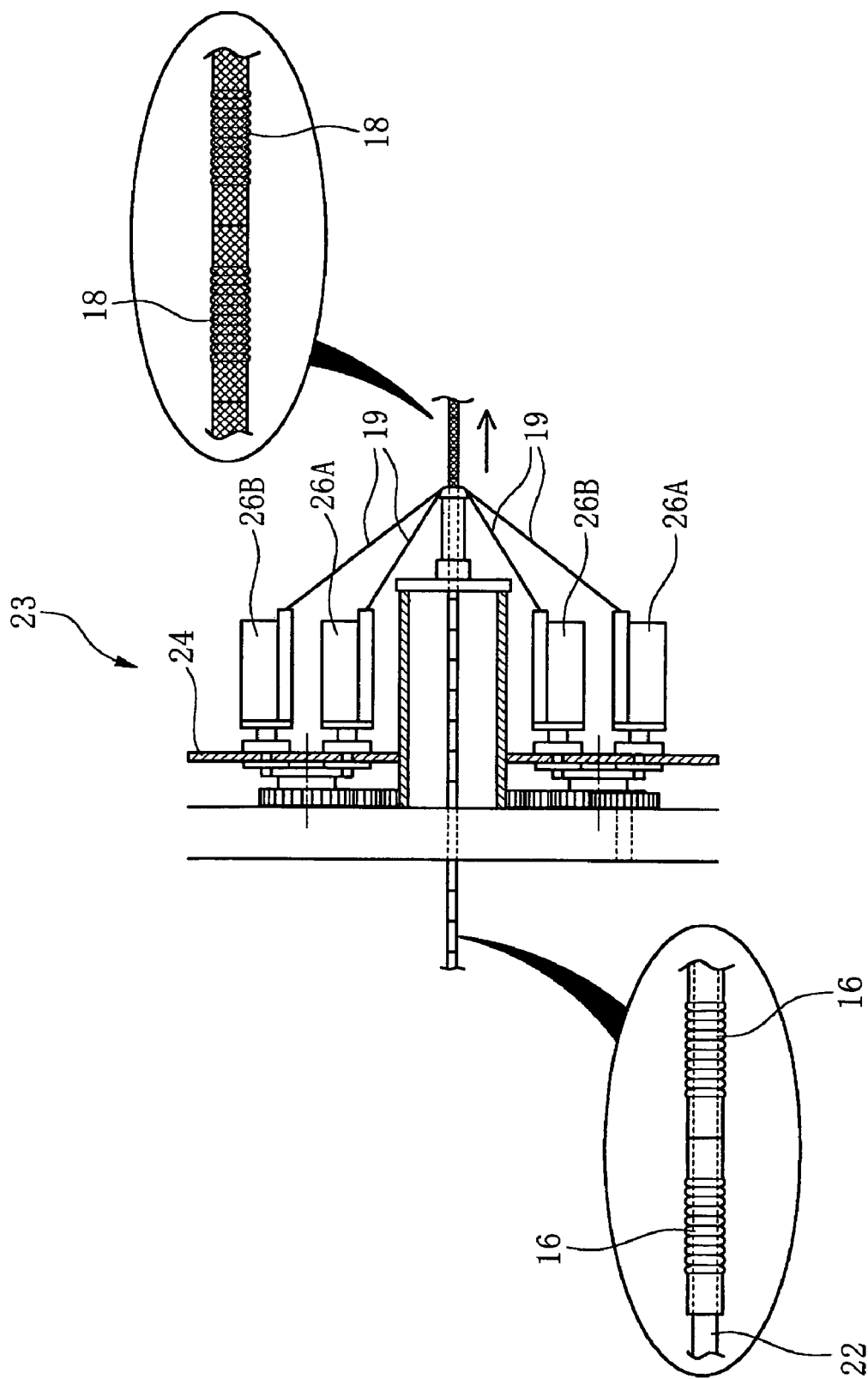
FIG. 3 is an explanatory view of a relevant part of production process of the vibration absorbing hose.

The molded inner rubber layer 16, for example, a plurality of the molded inner rubber layers 16 are slid on a long mandrel (for example, resin mandrel) 22 as shown FIG. 3. Next, the mandrel 22 with the inner rubber layer 16 thereon is mounted in a center hole of a braiding machine 23 shown in FIG. 3. Then, the mandrel 22 is carried forward. The reinforcing yarns 19 are braided on the outer surface of the inner rubber layer 16 as the mandrel 22 is carried.

The braiding machine 23 has a disk-like deck plate 24 and a plurality of paired carriers 26A and 26B which are disposed along a circumference of the deck plate 24. The carriers 26A and 26B of each pair follow a figure of eight respectively while the deck plate 24 rotates around the center thereof, and thereby the reinforcing yarns 19 are braided on the outer surface of the inner rubber layer 16. During braiding procedure, a pulling speed of the reinforcing yarns 19 is controlled so that braiding angle is generally equal in the corrugation hills and valleys of the corrugated portion 12, between the corrugation hills and valleys, or throughout entire corrugated portion 12. Here, the reinforcing yarn or yarns 19 are braided closely and intimately such that rubber layer 16 is not seen therethrough.

And, the inner rubber layer 16 which is laminated with the pressure resistant reinforcement layer 18 by braiding the reinforcing yarns 19 on an outer surface thereof as stated above is then dipped into a liquid compound for the outer rubber layer 20 subsequently to be coated with the outer rubber layer 20 on an outer side thereof. Next, the product laminated with the outer rubber layer 20 is put into a dry kiln for drying.

After dried, the mandrel 22 is removed and an elongate multi-layered hose product is obtained. Then, for example, the hose product is cut into desired length and thereby the hose 10 shown in FIGS. 1 and 2 is obtained. This is one example of production methods of the hose 10. The hose 10 may be produced in any other methods.

The hose 10 in the above-mentioned embodiment may ensure favorable flexibility of itself by the corrugated portion 12. Accordingly, if the hose 10 is designed short in length, favorable vibration absorbing property may be ensured in the hose 10. That means, the hose 10 ensures favorable vibration absorbing property while the required hose length is shortened. This may solve problem with respect to plumbing design in an engine room of a motor vehicle or handling of a plumbing hose during mounting of the plumbing hose.

Additionally, it also increases freedom to design plumbing layout to enable the required hose length short. And, favorable pressure resistance may be ensured by the pressure resistant reinforcement layer 18 formed in corrugated shape by braiding the reinforcing yarns 19 along or according to the corrugations.

In the hose 10 of the above-mentioned embodiment, as the pressure resistant reinforcement layer 18 is formed by providing or braiding reinforcing yarn or yarns, there is no problem that flexibility originated with the corrugated portion 12 is largely disturbed by providing the pressure resistant reinforcement layer 18.

Furthermore, as the pressure resistant reinforcement layer 18 may be formed seamless and continuous in both circumferential and longitudinal directions, the pressure resistant reinforcement layer 18 may enhance pressure resistance of the hose 10 effectively. And, in production process of the hose 10, the pressure resistant reinforcement layer 18 may be formed easily, and thereby the production cost of the hose 10 is lowered.

Figure 4:
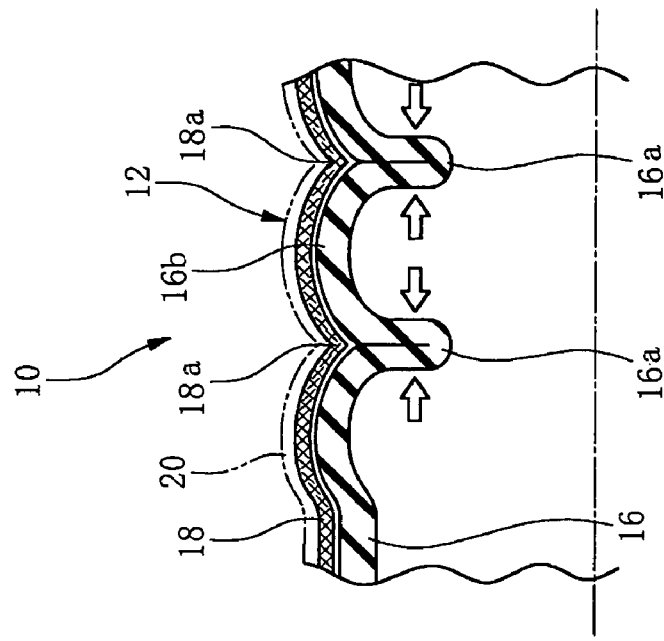
FIG. 4 is an explanatory view showing act of the vibration absorbing hose.
Figure 4:
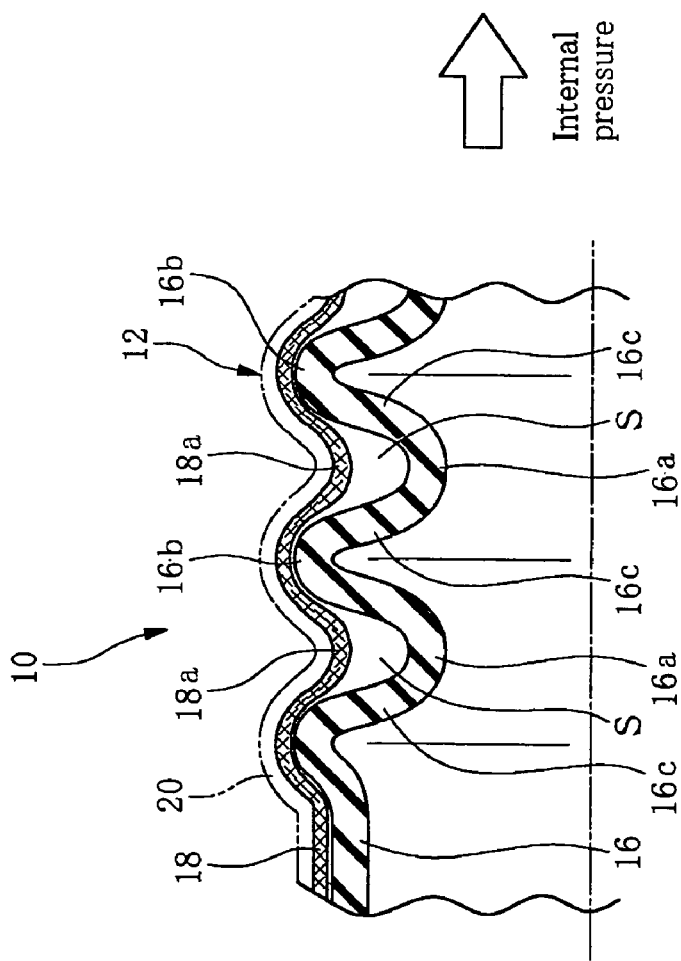

In the hose 10 of the above-mentioned embodiment, the radial depth or wave depth B of the portion or corrugation valley 18a of the pressure resistant reinforcement layer 18 is designed shallower than the depth A of the corrugation valley 16a of the inner rubber layer 16, and a predetermined gap or predetermined space S is defined between the portion 18a of the pressure resistant reinforcement layer 18 and the corrugation valley 16a of the inner rubber layer 16 (at production of the hose 10). So, the inner rubber layer 16 is deformed so that opposite sides of the corrugation valley 16a and the halfway portions 16c of the inner rubber layer 16, which define the gap S at production of the hose 10, come into direct and close contact each other without intervening the pressure resistant reinforcement layer therebetween under act of pressure fluid flowing inside the inner rubber layer 16 as shown in FIG. 4.

As a result, an apparent permeating area for permeating gas from the inside to the outside of the hose 10, namely substantial permeating area is decreased, therefore, gas permeation amount may be decreased. That is to say, the inner rubber layer 16 is partly deformed in close contact relation, gas permeation resistance of the hose 10 is effectively enhanced.

EXAMPLE 1

Some hoses are formed having different constructions as shown in Table 1, and evaluated with respect to refrigerant permeation amount, bursting pressure (pressure resistant property) and flexibility respectively. The results are shown also in Table 1.

TABLE 1

| | | Example 1 | | | | | | Comparative Example | |
|---|---|---|---|---|---|---|---|---|---|
| | | A | B | C | D | E | F | A | B |
| Dimension | Shape | Corrugated | Corrugated | Corrugated | Corrugated | Corrugated | Corrugated | Corrugated | Corrugated |
| | Inner diameter (valley, mm) | ø9.0 | ø9.0 | ø9.0 | ø9.0 | ø9.0 | ø9.0 | ø9.0 | ø9.0 |
| | Outer diameter (hill, mm) | ø20.0 | ø20.0 | ø20.0 | ø20.0 | ø20.0 | ø20.0 | ø20.0 | ø20.0 |

TABLE 1-continued

| | | Example 1 | | | | | | Comparative Example | |
|---|---|---|---|---|---|---|---|---|---|
| | | A | B | C | D | E | F | A | B |
| | Length of corrugated portion (mm) | 100 | 100 | 100 | 100 | 100 | 100 | 100 | 100 |
| | Hose length (mm) | 150* | 150* | 150* | 150* | 150* | 150* | 150* | 150* |
| Inner rubber layer | Material | IIR | IIR | IIR | IIR | IIR | IIR | IIR | IIR |
| | Wall thickness (hill, mm) | 1.0 | 1.0 | 1.0 | 1.0 | 1.0 | 1.0 | 1.0 | 1.0 |
| | Wall thickness (valley, mm) | 1.0 | 1.0 | 1.0 | 1.0 | 1.0 | 1.0 | 1.0 | 1.0 |
| | Valley opening angle | 40° | 40° | 40° | 40° | 75° | 100° | 40° | 120° |
| | Valley depth (radial depth, mm) | 3.0 | 3.0 | 3.0 | 3.0 | 3.0 | 3.0 | 3.0 | 3.0 |
| Reinforcement layer | Material | PET | PET | PET | PET | PET | PET | PET | PET |
| | Denier (de) | 1000 | 1000 | 1000 | 1000 | 1000 | 1000 | 1000 | 1000 |
| | No. of yarns | 3 yarns × 48 carriers | 3 yarns × 48 carriers | 3 yarns × 48 carriers | 3 yarns × 48 carriers | 3 yarns × 48 carriers | 3 yarns × 48 carriers | 3 yarns × 48 carriers | 3 yarns × 48 carriers |
| | Construction | Braided | Braided | Braided | Braided | Braided | Braided | Braided | Braided |
| | Valley depth (radial depth, mm) | 0 | 0.6 | 1.0 | 2.1 | 1.0 | 1.0 | 3.0 | 1.0 |
| Outer rubber layer | Material | Silicon type | Silicon type | Silicon type | Silicon type | Silicon type | Silicon type | Silicon type | Silicon type |
| | Wall thickness (mm) | 0.5 | 0.5 | 0.5 | 0.5 | 0.5 | 0.5 | 0.5 | 0.5 |
| Permeation of Refrigerant HFC-134a 90° C. (g/hose/72 h) | | 0.83 | 0.87 | 0.89 | 1.03 | 0.95 | 1.07 | 1.20 | 1.16 |
| Bursting pressure (MPa) | | 17.7 | 17.7 | 17.7 | 17.8 | 18.4 | 18.8 | 17.9 | 19.0 |
| Flexibility (N) | | 9.0 | 8.7 | 8.2 | 7.8 | 8.9 | 9.9 | 7.4 | 11.4 |

Note:
*Opposite ends of 25 mm are portions to be clamped respectively. Therefore, substantial hose length is 100 mm.

In the line "No. of yarns" of Table 1, "3 yarns×48 carriers" means that 3 parallel reinforcing yarns of 1000 denier (de) are braided on an 48-carrier machine.

In Table 1, tests or measurement with respect to refrigerant permeation amount, bursting pressure and flexibility are implemented in the following conditions.

[Refrigerant Permeation Amount (In weight)]

Figure 5:
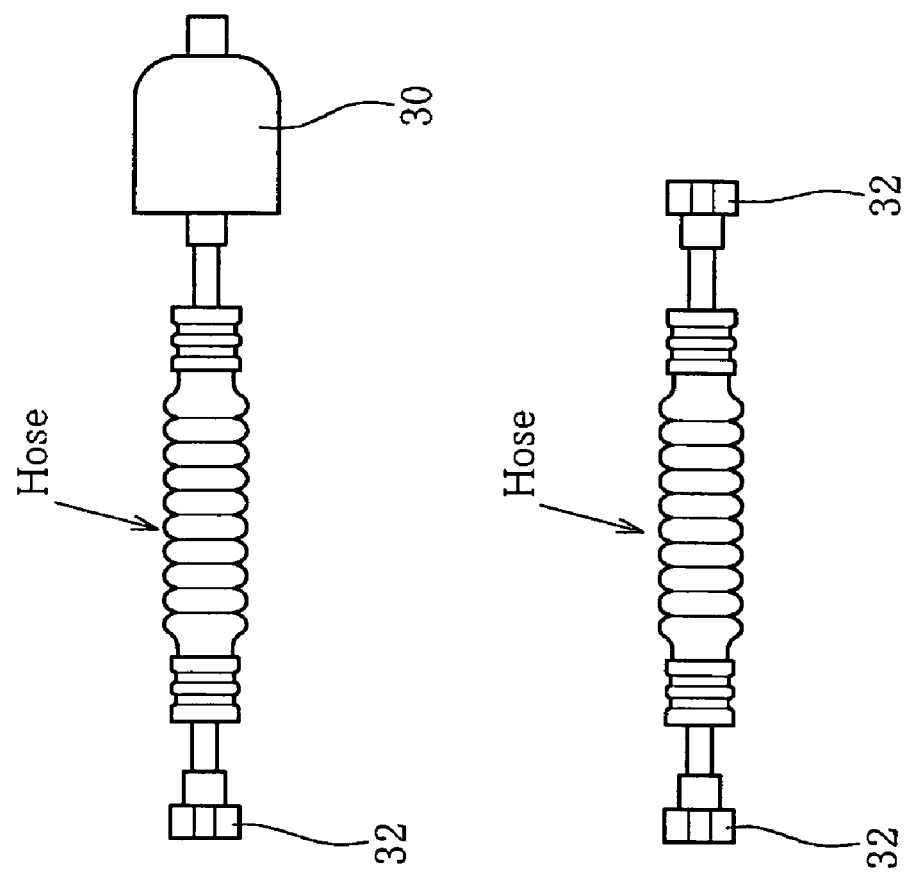
FIG. 5 is a view showing measuring method of refrigerant permeation resistance of examples of the vibration absorbing hose and comparative examples in order to confirm effects of the vibration absorbing hose.

As shown in FIG. 5, four sample hoses are prepared. Each of the three sample hoses is connected to muffler 30 with capacity of 50 cc at one end, refrigerant HFC-134a is filled to 70% of its capacity, and each of the three sample hoses is closed at the other end with caps 32. The rest one sample hose does not contain HFC-134a for checking weight change of a single hose or a hose itself, and is closed at both ends with the caps 32 as shown in FIG. 5, and in this state, weight change of the single hose is evaluated.

The sample hoses are placed in an oven at 90° C. and weight of the single hose and the sample hoses connected to the mufflers 30 is measured every 24 hours for 96 hours, and refrigerant permeation amount (in weight) per hose is calculated in the following formula:

[lost weight of the sample hose enclosed with refrigerant (96 hours—24 hours)—lost weight of the single hose (96 hours—24 hours)]

The refrigerant permeation amount is favorably as small as possible. Here, a value of 1.1 g/hose/72 hours is targeted.

[Bursting Pressure]

Bursting pressure indicates water pressure value which causes a hose to burst when water pressure is exerted internally to the hose at pressurizing speed of 160 Mpa/minute.

[Flexibility]

Figure 6:
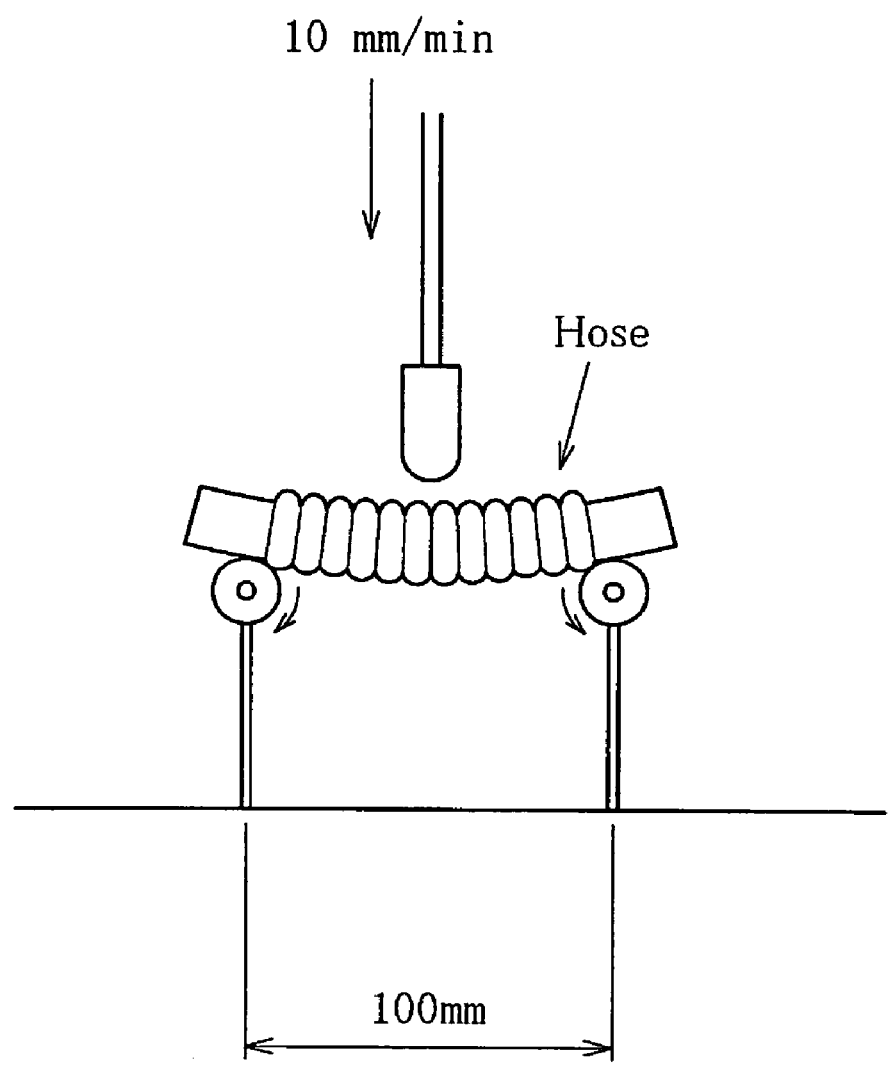
FIG. 6 is a view showing measuring method of flexibility of examples of the vibration absorbing hose and comparative examples.

As shown in FIG. 6, each of the sample hoses is supported by two support columns spaced apart 100 mm on a base plate. Then the hose is exerted a load at rate of 10 mm/minute in a center thereof, and maximum load or load at peak is measured as indicator of flexibility. The maximum load is favorably as low as possible or flexibility is favorably as much as possible, but here value of maximum 10 newton (N) is targeted.

As indicated by the results in Table 1, the hoses A to F of Example 1 (the hose 10) exhibit values under the targeted values of refrigerant permeation amount and flexibility, and superior in gas permeation resistance and flexibility compared to the hoses A and B of Comparative Example. And, all of the hoses A to F of Example 1 exhibit bursting pressure of 17 MPa or more, therefore, the excellent pressure resistance. Meanwhile, "Reinforcement layer" of Example 1 corresponds, for example, to the pressure resistant reinforcement layer 18, "Valley depth" of Inner rubber layer of Example 1 corresponds, for example, to the corrugation valley depth A, and "Valley depth" of Reinforcement layer of Example 1 corresponds, for example, to the radial depth B.

The form of the present invention herein described is to be taken as a preferred example thereof. In the present invention, the inner rubber layer 16 is formed so as to have equal wall thickness on corrugation hills 16b and valleys 16a. However, according to the circumstances, the inner rubber layer 16 may be formed so as to have larger wall thickness on the corrugation hills 16b than on the corrugation valleys 16a. This construction may favorably restrain gas permeation amount on the corrugation hills 16b as well as the corrugation valleys 16a of the inner rubber layer 16, and enhance more effectively gas or refrigerant permeation resistance entirely in the hose 10.

In the hose 10, the pressure resistant reinforcement layer 18 may be formed by winding the reinforcing yarns 19 spirally around the outer surface of the inner rubber layer 16 or knitting the reinforcing yarns 19 therearound so as to provide the pressure resistant reinforcement layer 18 with stretchability under the circumstances. It is understood that according to application of the hose, various changes may be made in the present invention without departing from the spirit and scope of the present invention.

Figure 7:
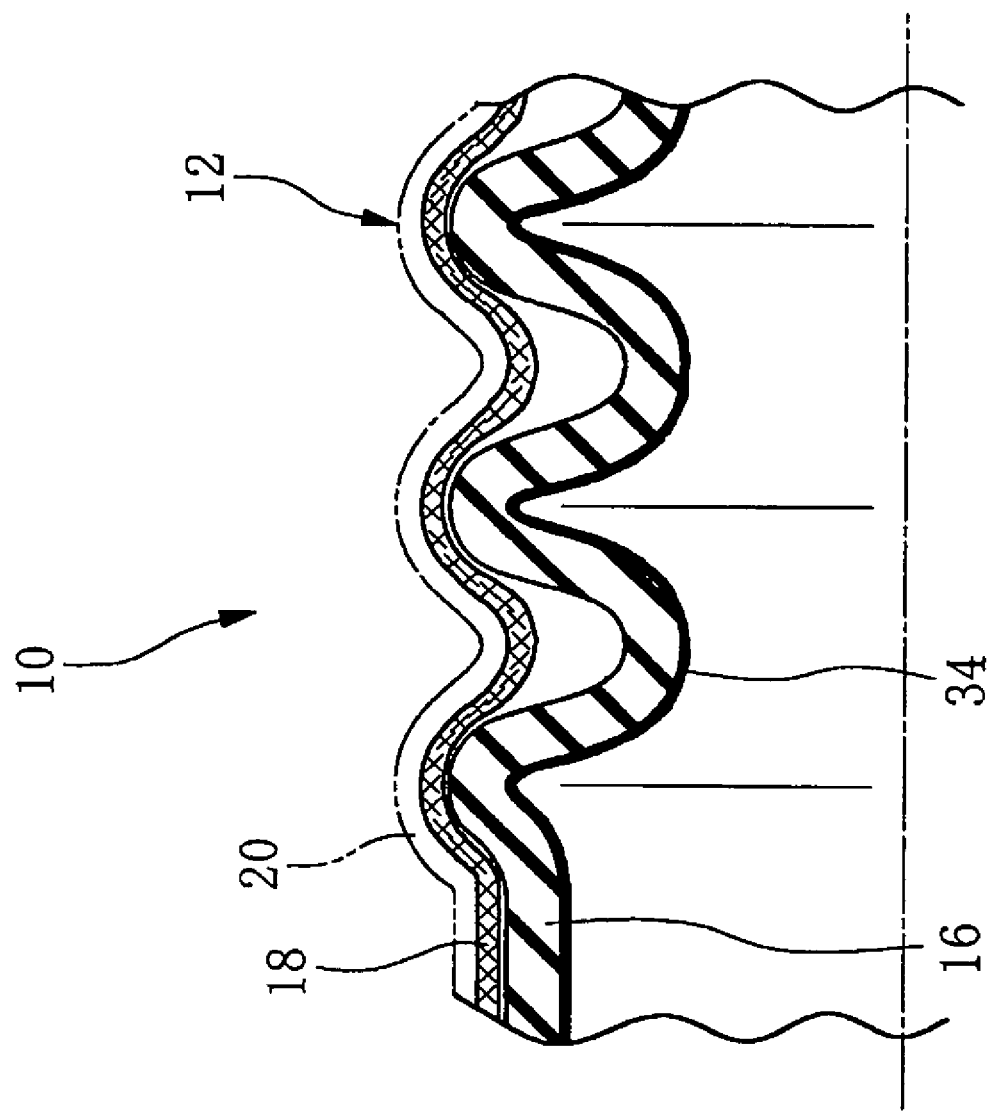
FIG. 7 is a sectional view of another vibration absorbing hose according to the present invention.
Figure 8:
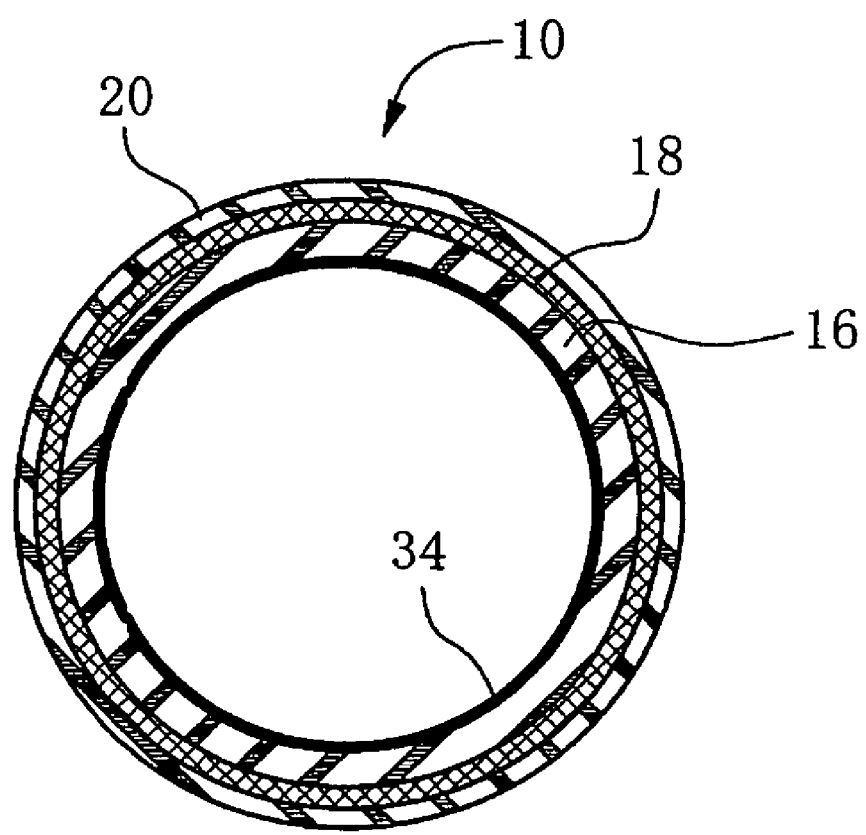
FIG. 8 is a sectional view of the another vibration absorbing hose, taken along a radial direction thereof.

For example, as shown in FIGS. 7 and 8, in the hose 10, resin membrane or coating 34 is laminated in an inner surface of the inner rubber layer 16 by electrostatic spraying resin.

Here, the resin membrane 34 is formed from resin powder by electrostatic coating or spraying in wall thickness or thickness of 50 μm to 250 μm. For formation of this resin membrane 34 (or resin powder by electrostatic coating or spraying), the inner rubber layer 16 has volume resistivity value of maximum $1 \times 10^6$ Ω-cm.

Figure 9:
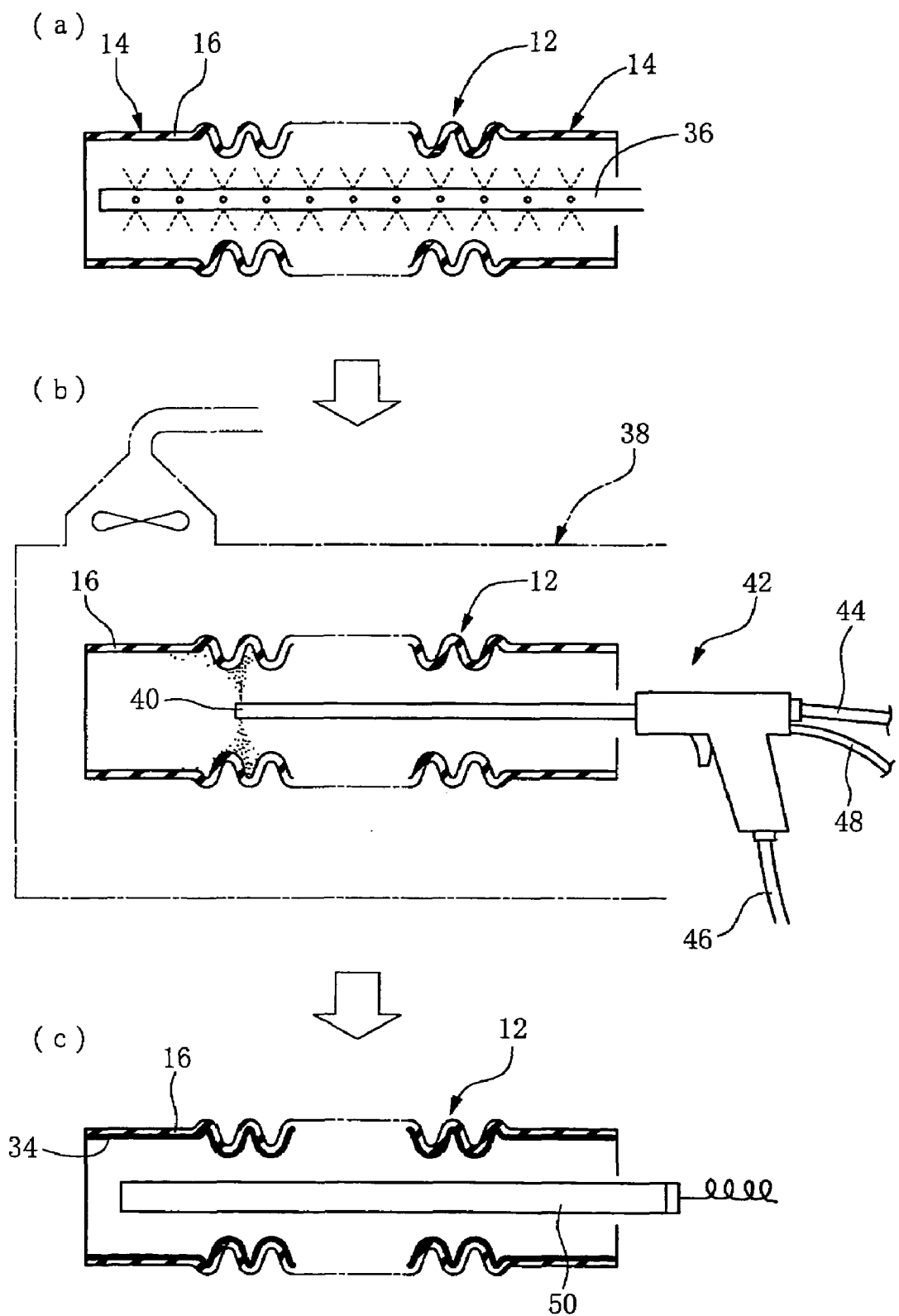
FIG. 9 (a) is an explanatory view of formation method of resin membrane in the another vibration absorbing hose, showing that adhesive agent is applied.

The hose 10 shown in FIGS. 7 and 8 may be formed in the same manner as the hose 10 shown in FIGS. 1 and 2, except resin membrane 34. The resin membrane 34 may be formed in the following manner. First, adhesive agent is applied to an inner surface of the inner rubber layer 16. The adhesive agent is applied, for example, in the following manner. As shown in FIG. 9(a), a spray nozzle 36 is inserted in the interior of the inner rubber layer 16, and then mist of the adhesive agent is sprayed onto the inner surface of the inner rubber layer 16 through a lot of jet perforations provided on the spray nozzle 36.

After the adhesive agent applied is dried, and then resin powder is electrostatic sprayed onto the inner surface of the inner rubber layer 16, for example, as follows. The inner rubber layer 16 is placed in the interior of a chamber 38 and the resin powder jets out onto the inner surface of the inner rubber layer 16 through a jet nozzle (nozzle spout) 40 on a tip end of a spray gun 42 in a direction perpendicular to an axis or in a radial direction (refer to FIG. 9 (b)).

To the spray gun 42, a resin powder feed pipe 44 and an air pipe 46 are connected. And, the spray gun 42 is connected via a conductive wire 48 to a high-voltage generator. During electrostatic coating or spraying by the spray gun 42, the resin powder supplied to the spray gun 42 is jet sprayed with air which is also supplied thereto through the jet nozzle 40 on the tip end. At this time, the resin powder is sprayed in negatively or positively charged state.

On the other hand, the inner rubber layer 16 is held by a metal plate and earthed via the metal plate. Here, high negative voltage is applied to the spray gun 42, the resin powder is thereby jet sprayed in negatively charged state. At that time, the inner rubber layer 16 acts as counter electrode (positive electrode), the negatively charged resin powder flies toward the inner rubber layer 16 in an electrostatic field generated upon application of high negative voltage, and attached to the inner surface of the inner rubber layer 16 to form resin coating or membrane thereon.

Next, the inner rubber layer 16 coated with the resin powder is taken out of the chamber 38, and heated in a heated oven or as shown in FIG. 9(c), heated by a heater 50 such as a far infrared ray heater which is inserted in the interior of the inner rubber layer 16 to heat and melt the resin powder. Then, the resin powder is cooled and thereby the resin membrane 34 is laminated in the inner surface of the inner rubber layer 16. After the resin membrane 34 is laminated in this manner, the inner rubber layer 16 is transferred to a processing step by the braiding machine 23.

And, here, as the resin membrane 34 is laminated with thickness 50 μm to 250 μm in the inner surface of the inner rubber layer 16, gas permeation resistance of the hose 10 may be remarkably enhanced.

EXAMPLE 2

Inner rubber layers of Example 2 (which are applied to the hose 10) and Comparative Examples C, D and E are formed from rubber materials blended as shown in Table 2 ("rubber composition") respectively, and the resin membrane is formed in inner surfaces of the inner rubber layers from various resin materials as shown in Table 2 with various wall thickness or thickness by electrostatic coating or spraying. Then, each resin membrane 34 is evaluated with regard to coating property and permeability to freon gas.

Figure 10:
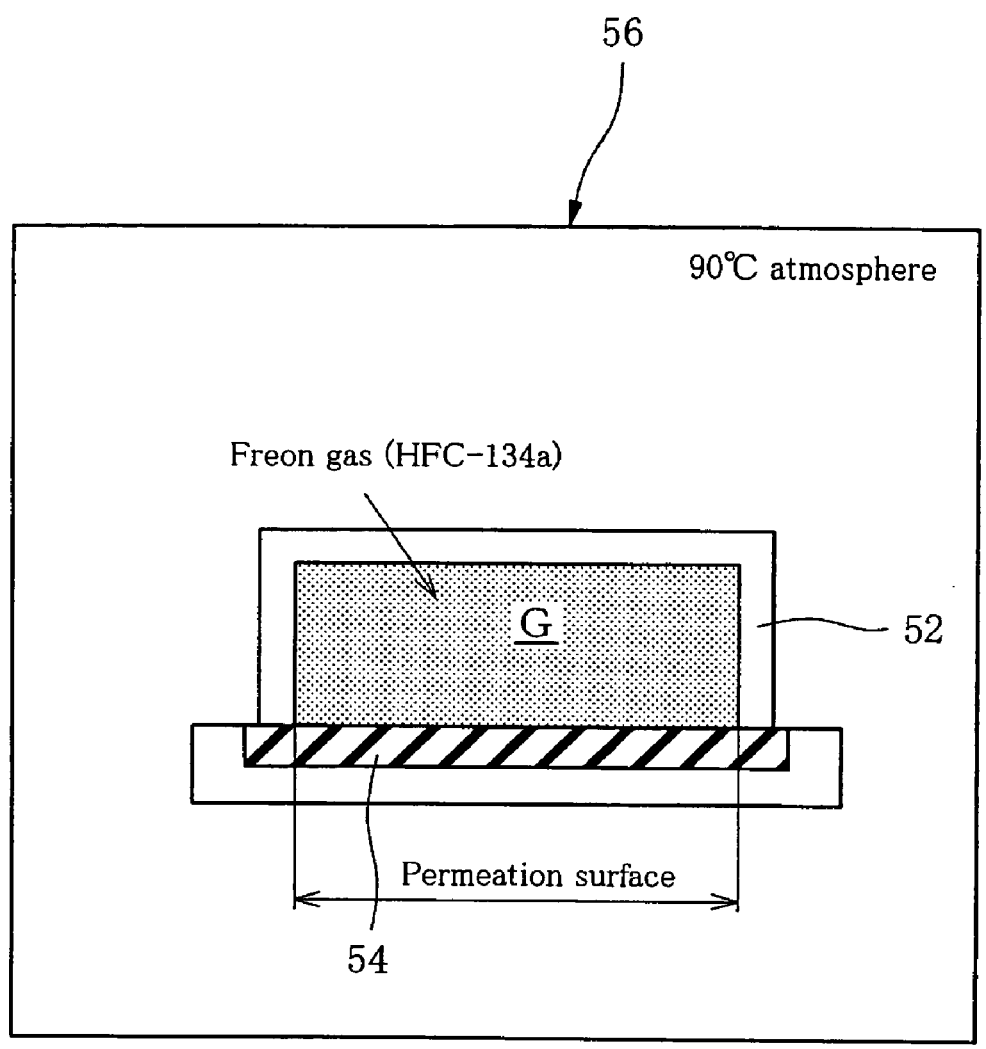
FIG. 10 is a view showing measuring method of gas permeation resistance of examples and comparative examples with respect to the another vibration absorbing hose in order to confirm effects of the another vibration absorbing hose.

Here, freon gas permeability or freon gas permeation resistance is evaluated as follows. As shown in FIG. 10, a cup 52 in which freon gas (HFC-134a) is enclosed at low temperature, is closed its opening with each of vulcanized rubber sheets 54 formed from the same materials (at various composition) as Example 2 and Comparative Examples C, D and E respectively and then placed in an oven 56 at 90° C. Then weight change (decreased amount) per day and per unit permeation surface area is calculated to obtain value of freon gas permeation amount.

The results are also shown also in Table 2.

TABLE 2

| | | Comparative Examples | | | Example 2 | | | | | | |
|---|---|---|---|---|---|---|---|---|---|---|---|
| | | C | D | E | A | B | C | D | E | F | G |
| Rubber composition | Polymer kind or type | IIR/Cl-IIR | <- | <- | <- | <- | IIR/Cl-IIR | <- | <- | EPDM | EPM |
| | Stearic acid | 1 | <- | <- | <- | <- | 1 | <- | <- | 1 | <- |
| | Zinc oxide | 5 | <- | <- | <- | <- | 5 | <- | <- | 5 | <- |
| | FEF carbon black | 60 | <- | <- | <- | <- | 60 | <- | 40 | — | <- |
| | MAF carbon black | — | <- | <- | <- | <- | — | <- | — | 90 | <- |
| | Naphthen type processed oil | 5 | <- | <- | <- | <- | 5 | <- | <- | — | <- |
| | Paraffin type processed oil | — | <- | <- | <- | <- | — | <- | — | 60 | <- |

TABLE 2-continued

|  |  | Comparative Examples | | | Example 2 | | | | | | |
| --- | --- | --- | --- | --- | --- | --- | --- | --- | --- | --- | --- |
|  |  | C | D | E | A | B | C | D | E | F | G |
| Inner rubber layer | Vulcanizing agent | Resin | <- | <- | <- | <- | <- | <- | S | PO | |
|  | Volume resistivity ($\Omega$-cm) | $1.6 \times 10^4$ | <- | <- | <- | <- | $1.6 \times 10^4$ | <- | $2.9 \times 10^9$ | $9.6 \times 10^5$ | $5.4 \times 10^5$ |
| Resin membrane | Type | — | PA11 | <- | <- | <- | Fluoro-carbon resin | Pyrolytic boron nitride (PBN) | PA11 | <- | <- |
|  | Thickness (mm) | — | 0.04 | 0.6 | 0.05 | 0.2 | 0.2 | 0.2 | 0.2 | 0.2 | 0.2 |
| Rubber/ resin | Coating property | — | . | x | . | . | | | | | |
|  | Permeation of freon (90° C., mg/cm² day) | 3.4 | 2 | 0.2 | 1.7 | 0.6 | 0.5 | 0.2 | 0.9 | 1.5 | 1.5 |
|  | Judgement | x | x | . | . | . | | | | | |

In the results of freon gas permeation test, judgement is made based on Comparative Example C. If permeation of freon (value of freon gas permeation amount) is equal to or less than 50% (1.7 mg/cm² day) of that of Comparative Example C, judgement is indicated by a symbol ".". (good). If permeation of freon is over 50% thereof, judgement is indicated by a symbol "x" (inferior).

As for coating property with respect to resin membrane in Table 2, if coating is made in uniform wall thickness or thickness, judgement is indicated by a symbol "." (good). If it is difficult for coating to be made in uniform wall thickness or thickness (including the case that resin powder remains on a inner surface of the inner rubber layer), judgement is indicated by a symbol "x" (inferior). In borderline case, judgment is indicated by a symbol "."

Judging from the above results, it may sufficiently improve permeability resistance to freon to laminate the inner surface of the inner rubber layer with the resin membrane of thickness of 50 μm to 250 μm (specifically 50 μm to 200 μm). Therefore, the hose 10 including such resin membrane 34, as shown in FIGS. 7 and 8 has not only excellent permeability resistance to gas, coupled with gas permeation resistance brought by the inner rubber layer 16 partly deformed in close contact relation but also favorable pressure resistance brought by the pressure resistant reinforcement layer 18 laminated on the outer surface of the inner rubber layer 16 and favorable vibration absorbing property brought by the corrugated portion 12.

Figure 11:
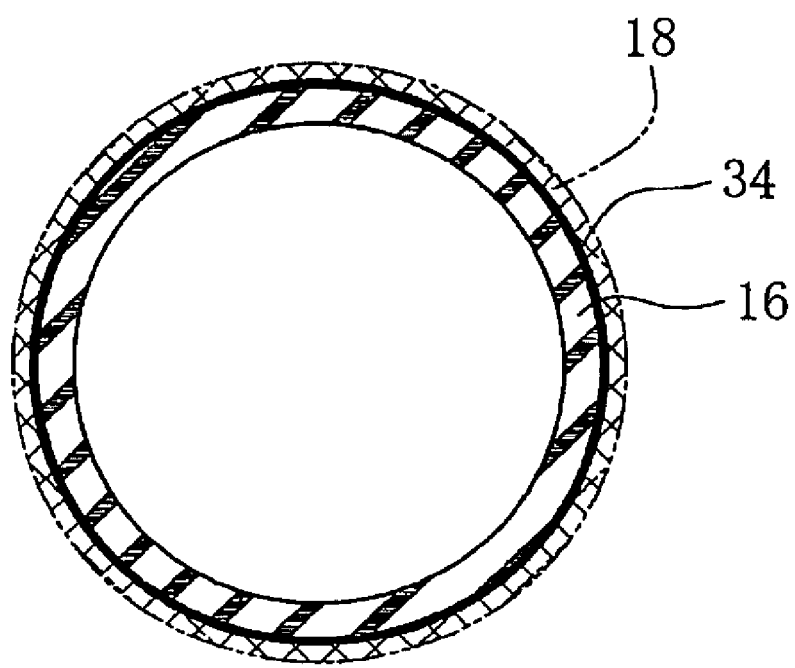
FIG. 11 is a sectional view of yet another vibration absorbing hose.
Figure 12:
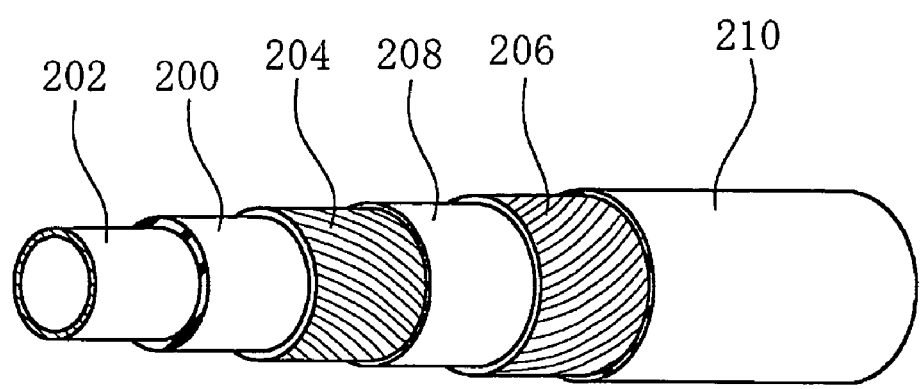
FIG. 12 is a perspective view of one of conventional vibration absorbing hoses.
Figure 13:
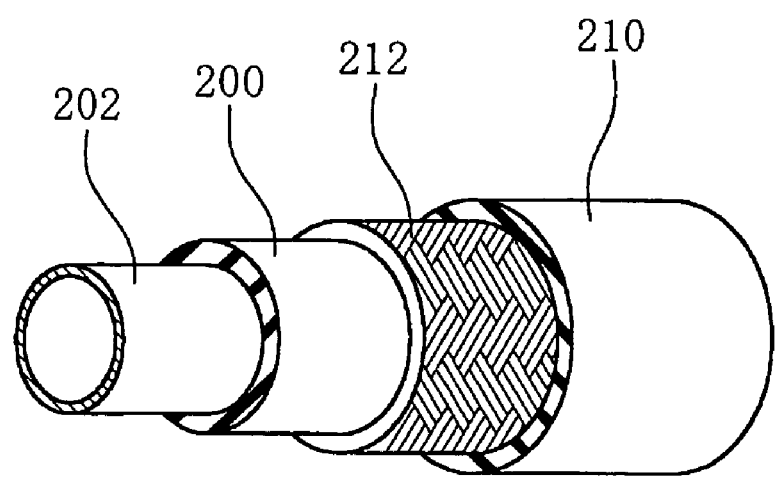
FIG. 13 is a perspective view of another conventional vibration absorbing hose having braided reinforcement layer.
Figure 14:
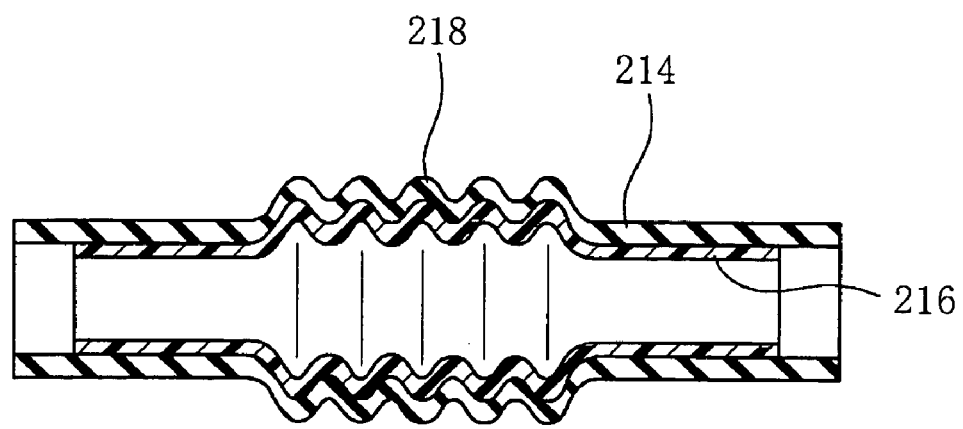
FIG. 14 is a sectional view of one vibration absorbing hose which is different from the conventional vibration absorbing hoses in FIGS. 12 and 13.

As shown in FIG. 11, the resin membrane 34 may be laminated on an outer surface of the inner rubber layer 16, instead of in the inner surface thereof, and the pressure resistant reinforcement layer 18 may be laminated on an outer side of the resin membrane 34.

We claim:

1. A vibration absorbing hose, comprising;
    tubular rubber layer having corrugations,
    pressure resistant reinforcement layer laminated on an outer surface side of the rubber layer and formed by providing reinforcing yarn or yarns on or along the outer surface side of the rubber layer,
    a radial depth B of the pressure resistant reinforcement layer at a position of each of corrugation valleys of the rubber layer having such relationship with respect to a corrugation valley depth A of the rubber layer as 0< or =B< or =0.7×A, and
    an opening angle θ of each of the corrugation valleys of the rubber layer satisfying a condition of θ< or =100°.

2. The vibration absorbing hose as set forth in claim 1 further comprising;
    a resin membrane laminated in an inner surface of the rubber layer, or on an outer surface of the rubber layer and in an inner side of the pressure resistant reinforcement layer.

3. The vibration absorbing hose as set forth in claim 2, wherein the resin membrane has a thickness of 50 μm to 250 μm.

4. The vibration absorbing hose as set forth in claim 2, wherein the resin membrane is formed from polyamide resin or polyamide type resin, or fluoro-resin or fluoro-type resin.

5. The vibration absorbing hose as set forth in claim 2, wherein the resin membrane is formed or laminated by electrostatic coating.

6. The vibration absorbing hose as set forth in claim 5, wherein the rubber layer has volume resistivity of maximum $1 \times 10^6 \Omega$-cm.

7. The vibration absorbing hose as set forth in claim 1, wherein the pressure resistant reinforcement layer is laminated on an outer surface side of the rubber layer by braiding the reinforcing yarn or yarns.

8. The vibration absorbing hose as set forth in claim 1, wherein a bursting pressure of the vibration absorbing hose is minimum 1 MPa.

9. The vibration absorbing hose as set forth in claim 1, wherein construction of the vibration absorbing hose is suitable for plumbing hose to be arranged in an engine room of a motor vehicle.

* * * * *